United States Patent [19]

Hughes et al.

[11] Patent Number: 5,541,249
[45] Date of Patent: Jul. 30, 1996

[54] INJECTION MOLDABLE CERAMIC AND METALLIC COMPOSITIONS AND METHOD OF PREPARING THE SAME

[75] Inventors: O. Richard Hughes, Chatham, N.J.; Hongkyu Kim, Oberursel; Gerd Wingefeld, Hofheim, both of Germany

[73] Assignee: Hoechst Celanese Corp., Somerville, N.J.

[21] Appl. No.: 629,495

[22] Filed: Dec. 18, 1990

[51] Int. Cl.⁶ .................................................. C08K 3/00
[52] U.S. Cl. ........................ 524/424; 524/39; 524/442; 524/428; 524/430; 524/437; 524/431
[58] Field of Search .................... 501/88, 96; 524/39, 524/442, 428, 430, 437, 431, 424

[56] References Cited

U.S. PATENT DOCUMENTS 5,001,091  3/1991  Pujari et al. ................................. 501/87

*Primary Examiner*—Charles T. Jordan
*Assistant Examiner*—Anthony R. Chi
*Attorney, Agent, or Firm*—Palaiyur S. Kalyanaraman

[57] ABSTRACT

Provided is an injection moldable composition suitable for forming ceramic or metallic greenbodies. The composition comprises in combination an inorganic or metallic filler in an amount of from about 63 volume percent to about 92 volume percent, a binding organic matrix resin, and an organosilane processing reagent represented by the general formula:

$$SiX_1X_2X_3X_4$$

wherein at least one of $X_1$, $X_2$, $X_3$ or $X_4$ is an unfunctionalized alkyl or alkenyl group having 10 to 35 carbon atoms and at least one of $X_1$, $X_2$, $X_3$ or $X_4$ is an alkoxy group or halide, such that the moldable composition exhibits a low initial mixing torque upon mechanical agitation. These compositions offer excellent advantage in processibility using conventional mixing and molding equipment.

Also provided is a process for preparing the moldable compositions.

20 Claims, No Drawings

INJECTION MOLDABLE CERAMIC AND METALLIC COMPOSITIONS AND METHOD OF PREPARING THE SAME

TECHNICAL FIELD

The present invention relates to injection-moldable compositions including inorganic fillers and organic binders. More specifically, wherein the fillers have been surface-treated with certain organosilane agents prior to mixing to improve dispersibility and reduce mixing torques.

BACKGROUND OF INVENTION

It is well known in the art that compatibility of metallic or inorganic fillers with organic polymers may be improved by surface treatment of the former with organosilanes or surfactants. For example, U.S. Pat. No. 4,336,284 teaches pretreating coal ash fly with organotitanates, organosilanes and the like.

U. S. Pat. No. 4,724,167 similarly teaches the art of procreating silicon with organopolysiloxanes, U.S. Pat. No. 4,369,265 concerns readily dispersible pigments coated with organo-silicone polymer.

U. S. Pat. No. 4,162,245 teaches the method of pretreating inorganic fillers with certain silanes which process advantageously reduces the viscosity of the composition on mixing with an organic polymer resin that can then be heat-cured. Four silanes were found to be useful in that process: $(CH_3O)_3SiCH_2CH_2Cl$; $(CH_3O)_3SiCH_2CH_2CF_3$; (HCl) $(CH_3CH_2)_2NCH_2CH_2)_3SiC_{18}H_{37}$ and $(CH_3O)_3SiCH_2CH_2OCOC(CH_3)=CH_2$. Other silanes were tried but found not useful. The silanes were used to pretreat filler materials in an acidic environment. The isolated filler material was then combined with the organic resin. The content of treated filler material in the final formulation was from 50 to 75 wt %, equivalent to a range of about 34 to about 62 volume percent.

Inspection of such earlier methods and compositions reveals significant drawbacks especially when high density metallic or ceramic parts are desired. Requirements for getting such a high density metallic or ceramic part include: (1) the presence of large amounts (greater than 63 volume percent) of metallic or inorganic filler in the molding composition, and (2) the filler being present often in finely divided state with an optimal particle size distribution. If one attempts to prepare such molding compositions with high loading of filler (greater than 63 volume percent) by using prior art methods, poor particle dispersion occurs, and it becomes difficult to achieve uniform mixing and fine powder dispersion, leading to high mixing torques, high mixing energies, long mixing times and difficult mixing operation, and may yield dry, friable, agglomerated compositions. This also precludes processability in conventional mixing and molding equipment.

Accordingly, it is a general objective of the present invention to provide novel molding compositions containing finely divided metallic or inorganic fillers in excess of 63 volume percent dispersed in organic binder matrix resins.

It is another object of the present invention to provide a method of surface treatment for such filler particles that increases their dispersibility and reduces mixing torques upon mixing with organic binder components at high concentrations.

It is yet another object of this invention to provide improved injection moldable compositions, that are capable of being processed by conventional mixing and molding equipment while employing low mixing torques and energies.

These and other objects, as well as the scope, nature and utilization of the invention will be apparent from the following description and claims.

SUMMARY OF INVENTION in accordance with the present invention there is provided a composition suitable for injection molding. The composition includes an organic matrix resin and a pretreated filler material. Examples of organic matrix resins include polyolefins, polyamides, polyesters, polycarbonates, polyacetals and the like. Polyacetal resins are thermoplastic materials and can be homopolymers or copolymers. For example, the Delrin® resin (available from E. I. DuPont de Nemours & Co., Wilmington, Del.) is a homopolymer of formaldehyde, while the Celcon® resin (available from Hoechst Celanese Corporation, Somerville, N.J.) is a copolymer of trioxane with ethylene oxide consisting essentially of repeating units of carbon-oxygen bonds. The binder resin is present in the injection molding composition in concentrations generally ranging from about 8 to about 37 volume percent and preferably from about 22 to about 30 volume percent. The other major component in the molding composition contains particles of metal or inorganic filler such as silicon powder that has been pretreated by coating on its surface an organosilane represented by the formula:

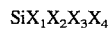

wherein at least one of $X_1$, $X_2$, $X_3$ or $X_4$ is an unfunctionalized alkyl or alkenyl group having generally from about 10 to about 35 carbon atoms, typically from about 12 to about 30 carbon atoms and preferably from about 15 to about 20 carbon atoms, more preferably 18 carbon atoms, and at least one of $X_1$, $X_2$, $X_3$ or $X_4$ is an alkoxy group or halide such as F, Cl, Br or I. If more than one alkyl/alkenyl group is present, at least one of them is described as above; the other(s) could be the same or very similarly long alkyl(s). If alkoxy groups are present, they may contain from about 1 to 5 carbons, preferably 2. It is essential that the alkyl/alkenyl group is unfunctionalized. Particularly functionalities such as ester and amine are not desirable. Several such silanes are commercially available like for example, n-octadecyltriethoxysilane, n-octadecylsilane, n-octadecy-ldimethylmethoxysilane, n-octadecyltrichlorosilane and the like.

In addition to the two major components, additives such as other binder components, surfactants, wetting agents, dispersing agents, mold release agents, plasticizers, nucleating agents and the like could be used in the composition. Some typical examples of such additives include waxes as antiadhesion agents (e.g., N,N'-ethylene bis-stearamide, sold under the name Wax C by Hoechst AG, Frankfurt, Germany) polyethylene glycol as plasticizer (e.g., PEG 8000 from Union Carbide), polydioxolane as plasticizer, or surfactants such as, Hypermer KD-3, a polymeric dispersant from ICI Specialty Chemicals, Wilmington, Del.) and stearic acid. Also mold release agents (e.g., Okerin 1865Q, a casting wax supplied by Astor Wax Corp., Harrison, N.Y.) and nucleation agents (e.g., Celcon U10, a high strength acetal terpolymer from Hoechst Celanese Corp., Engineering Plastics Division, Chatham, N.J.) may be included in the formulation. Some Celcon® resins give off formaldehyde during processing steps encountered in the present invention. When such resins are used as binders, formaldehyde traps such as cyanoguanidine may be included in the composition. When additives are used, they are used in quantities such that the filler powder content in the composition is at least 63 volume percent.

DESCRIPTION OF THE PREFERRED EMBODIMENTS

The molding compositions of the present invention contain surface-treated filler materials which are uniformly and finely dispersed in an organic matrix resin such that even when high loading levels of the filler are employed in the formulation, low initial mixing torques are achieved during mixing and low total mixing energies result. Loading levels of the filler materials in the composition are generally from about 63 volume percent to about 92 volume percent, typically about 64 to 84 volume percent and preferably about 67 volume percent. Surface treatment of the filler material is preferably done prior to mixing with the binder and is preferably accomplished by treating it with a silane of the general formula:

$$SiX_1X_2X_3X_4$$

wherein at least one of $X_1$, $X_2$, $X_3$ or $X_4$ is an unfunctionlized alkyl or alkenyl group having from about 10 to about 35 carbon atoms, typically from about 12 to 30 carbons, preferably from about 15 to about 20 carbons, and more preferably 18 carbon atoms, and at least one of $X_1$, $X_2$, $X_3$ or $X_4$ is an alkoxy group or halide such as F, Cl, Br or I. If more than one alkyl/alkenyl group is present, at least one of them is described as above; the other(s) could be the same or very similarly long alkyl(s). If alkoxy groups are present, they may contain from about 1 to 5 carbons, preferably 2. It is essential that the alkyl/alkenyl group is unfunctionalized. Particularly functionalities such as ester and amine are not desirable. Several such silanes are commercially as noted above.

The silane is used in amounts from about 0.1 to 15 wt % based on the filler; the exact amount required depends on the surface area of the filler. In general, the filler particles should have at least one monolayer of silane coverage. For example, for a typical silicon powder with 1 m²/gm surface area and a mean particle size of 1 to 10, 0.1 to 1 wt % silane is required.

The filler material used in the composition is chosen according to the intended function of the designed part as is known to those skilled in the art. Typical materials include (i) inorganics such as silicon, silicon nitride, silicon carbide, alumina, aluminum nitride, titania, zirconia and mixtures thereof, and (ii) metal powders such as iron, stainless steel, chromium alloys, nickel alloys, bronze, and the like.

The filler materials used in the present invention have mean particle diameters and particle size distributions as mentioned earlier. Preferred mean particle diameters range from about 0.01 to 1000 (chemical formula), and more preferably 0.1 micron to 100 microns. The use of powders with such preferred characteristics enables the fabrication of molding formulations with high filler contents, while retaining good moldability.

The binder matrix resins used in the present invention could be any organic resin mentioned above. Preferred resins are the polyacetal materials, some of which are described above.

The present invention also relates to the process of obtaining an injection moldable composition. The process starts with surface-treating the filler material. In an embodiment of the invention, silicon filler powder is uniformly well dispersed in isopropyl alcohol, or isopropyl alcohol containing added water from about 5 to 50 vol. %, with a high-speed mixer, while octadecyltriethoxysilane was slowly added to this slurry. An acid such as acetic acid could also be present, but not always necessary. Temperature rose during this operation and was maintained at around 60° C. It was stirred and maintained at around 60° C. for about 15–60 minutes, after which time it was transferred to a centrifuge and centrifuged to isolate the surface-modified silicon as a cake. This was further washed with isopropyl alcohol and dried at about 120° C. for about 5 to 10 hours.

A polyacetal resin (Celcon® M450, PEG 8000,) and Wax C powders were well mixed, to which the above surface-modified silicon was added and mixed again. This mix was melt compounded by adding the powder to the mixing bowl of a Computerized Brabender Prep Center drive unit (Model PLD-651, supplied by C. W. Brabender Instruments, Inc., S. Hackensack, N.J. fitted with a 60 cc Prep Mixer mixing bowl), and mixing at about 190° C. and rotating speed of 50 rpm. This dispersibility was checked by measuring the mixing torque from initial mixing time until it no longer changed.

Plotting the torque versus mixing time gives an indication of the ease of dispersion; dispersion time is critical to processibility in conventional equipment. The total mixing energy is calculated from the area under the curve. The lower the mixing torque, both initial and final, and the mixing energies are, the easier and faster is the dispersibility and, as it would be obvious to those skilled in the art, the easier would be processing of such a formulation, thus enabling processing by conventional mixing and molding equipment. Conventional mixing and molding equipments are equipments that have been developed in the industry to process commodity thermoplastic polymers and thus readily available. Such polymers can be processed at temperatures up to about 300° C. and they exhibit relatively low melt viscosities from about 100 to about 10,000 Pas at shear rates in the range 1 to 1,000 s$^{-1}$.

In the embodiment described above using surface treated silicon powder and a polyacetal binder, the initial torque and final, after 60 minutes, torque were both found to be under 100 meter grams and the total mixing energy over 60 minutes of mixing was less than 2000 meter grams. Because of such low torques, addition of one ingredient to the other could be continuously maintained. However when the silicon powder was not surface-modified by silanes according to the present invention, as well as when it was modified only by conventional surfactants such as stearic acid or Hypermer KD-3 without any silane modifier, high initial torques, typically over 1,000 meter grams, final torques after 60 minutes, typically over 200 meter grams, and total mixing energies over 60 minutes, typically in 8000–15,000 meter gram range, were observed. In addition, because of the high initial torques which did not subside fast enough, addition of ingredients to the mixing bowl had to be periodically suspended, in order to bring down the torque before resuming addition. The timing of additions of material is thus very tedious and requires special skills on the part of the operator.

The mixing torques and mixing energies observed while employing formulations of the present invention are low enough to enable continuous processing of such formulations using conventional equipment such as those described above. In the present embodiment a Brabender Prep Center drive unit (Model PLD-651) fitted with a Twin Screw Extruder was used to fabricate continuous cohesive strands of the compounded mix which were then pelletized to a form suitable as a feed to an injection molding machine. On the other hand, when the silicon powder was not treated according to the present invention and then compounded with the polyacetal binder, a poorly and inhomageneous compounded mix resulted. This mix was dry, abrasive, voluminous, and was not extrudable in a continuous strand.

The pelletized mix obtained from this invention could be shaped and converted into metal or ceramic parts by employing standard techniques known to those skilled in the art. In one embodiment of the present invention, the pelletized mix was dried in air and shaped by injection molding with an Arburg "All Rounder" machine (Model 221-55-250, supplied by Polymer Machinery, Kensington, Conn.). In a typical molding experiment, the molding conditions were: melt temperature was between 175 and 200° C., while the mold temperature was between 130 and 140° C. Injection pressure was between 500–1,000 psig and the injection speed varied between medium and maximum. The screw speed was 200–300 rpm and back pressure was zero. The mold had three cavities to form three different shapes including a disk, a stepped bar, and a flex,bar. The molded parts faithfully retained the shape of the mold cavity and had smooth surfaces.

The organic components in the resulting molded part were removed by controlled oxidation in an air oven whose temperature was raised according to a carefully designed time-temperature schedule. A visually porous, blister-free and crack-free silicon body retaining the shape of the mold resulted. The parts were also shown to be defect free upon examination by X-Ray Radiography. This body was then converted into a dense silicon nitride body, still retaining the shape of the mold, by reacting in a nitrogen atmosphere at temperatures from about 1,000° C. to 1,450° C. at a heating rate of 6°/hour.

The following examples are provided in order to further illustrate the present invention. The examples are in no way meant to be limitative, but merely illustrative.

EXAMPLE I

Molding composition from surface-treated silicon powder and a polyacetal binder:

Octadecyltriethoxysilane (5 g) was mixed into a solution of water (836 g), acetic acid (46 g) and isopropyl alcohol (47 g) in a kettle of a high energy, high rpm dispersion mixer (Kady mixer). Silicon powder (Sicomill, grade 4c-p, supplied by Kema Nord Industriekemie, Ljungaverk, Sweden; with mean particle diameter of 7.9 rpm)(250 g) was added slowly with vigorous stirring to disperse it. Temperature was allowed to rise to 60° C. when more octadecyltriethoxysilane (5 g) and silicon powder (250 g) were added in a similar fashion. It was stirred for another 30 minutes and then centrifuged at 3,500 rpm for 30 minutes to separate a wet cake. This cake was washed with isopropyl alcohol and then spread out in shallow trays to air dry. It was further dried in a nitrogen purged oven at 120° C. for 10 hours.

A molding formulation including a polyacetal binder was made as follows. A powder mix was made by mixing the above silane-treated silicon powder (83.30 g), Celcon® M450 polyacetal (an acetal copolymer resin with a melt index of 45, melting point 162° C., and flow temperature 174° C., supplied by Hoechst Celanese Corporation, Engineering Plastics Division, Chatham N.J.) (20.00 g), PEG-8000 and Wax C. This powder mix was melt compounded by adding to a 55 cc Brabender mixing head fitted with roller blades and operated at 190° C. and 50 rpm. The mixing torque rose to 100 meter grams without exhibiting an initial torque maximum. Because of this low torque, the entire addition could be finished in 2.5 minutes. The formulation was well mixed within minutes but mixing was continued for one hour. Final torque was 70 metergrams. Total mixing energy after ten minutes was 251 metergrams and after 60 minutes was 1681 meter grams.

In the above formulation, the quantity of silicon powder amounted to 68 volume percent. At the end of the operation, a continuous strand of melt compounded material was extruded; the strands had sufficient strength to withstand cooling while being conveyed on a moving belt to a pelletizer where it was pelletized.

EXAMPLE 2

Attempt To Mix and Extrude Formulation With Untreated Silicon Powder (comparative Example I):

Untreated silicon powder (Sicomill, grade 4c-p, supplied by Kema Nord Industriekemie) (83.30 g), Celcon® M450 resin (20.13 g), polyethyleneglycol PEG 8000 (4.07 g) and Wax C (1.24 g) were mixed as powders. This powder mix was added to a 55 cc Brabender mixing bowl fitted with roller blades and operated at 190° C. and 50 rpm. The torque rose steeply to values in the 1800 mg range, forcing the addition to be suspended until the initial torque subsided. Addition was then resumed. By this process it took 12 minutes for the entire addition to be complete.

Torque decreased slowly over 1 hour to 300 mg. Total energy of mixing at 1 hour was 14432 mg. Since torque was still decreasing after 1 hour, it was obvious that uniform mixing had not been achieved even in 1 hour mixing time. At the end of the operation, no continuous strand of melt compounded material could be extruded. The short segments that did emerge had a dry appearance. After a short period, the mixer was packed with poorly compounded powder that would not pass.

EXAMPLE 3

Molding formulation from surface-treated silicon powder and polypropylene binder:

Silicon powder (Sicomill, grade 4c-p, 1,000 g) was surface treated as in Example 1 using octadecyl triethoxysilane in isopropyl alcohol. The product was isolated as before and 85.86 grams were mixed with atactic polypropylene (8.573 g), isostatic-polypropylene (2,98 g), Okerin Wax 1865Q (2.614 g) and stearic acid (1.81 g) and melt blended in a Brabender mixer described in Example 1 at 190° C. and 50 rpm speed. The above composition, containing 67.5 volume percent silicon, had a total mixing energy of 12 mg after 60 minutes.

When silicon powder was not surface-treated in the above formulation, the total mixing energy over 60 minutes was 3959 mg.

EXAMPLE 4

Molding formulation from silicon surface modified by stearic acid surfactant only (Comparative Example II)

Silicon powder (Sicomill, grade 4c-p) (1000 g) was treated with stearic acid (20 g) in isopropyl alcohol in a manner similar to Example 1 and the product was isolated and dried in trays. However, on drying, stearic acid became separated and appeared as a white deposit on the surface of the black layer of silicon particles, indicating an inhomogeneous binding. The powder (84.94 g) was mixed with Celcon® M450 (18.186 g), polyethylene glycol PEG 8000 (3,667 g) and Wax C (1.121 g) and melt blended in a Brabender mixer as above at 190° C. and 50 rpm. A high initial torque of 1800 mg was observed which declined to about 300 mg after 60 minutes. Total mixing energy in 60 minutes was 8935 mg.

EXAMPLE 5

Molding formulation from silicon powder surface treated by Hypermer KD-3 only (Comparative Example III):

Untreated silicon powder (Sicomill, grade 4c-p) (83.3 g), Celcon® M450 (17.84 g), PEG 8000 (3.60 g), Wax C (1.10 g) and the processing aid Hypermer KD-3 (2.20 g) were mixed and the mixed formulation and added to a Brabender mixer as above and blended at 190° C. and 50 rpm. Initial torque went above 3000 mg forcing the addition to be suspended temporarily until the mixing torque decreased. Due to the delay this resulted in an addition time of 8 minutes. After 60 minutes, the torque was 275 mg and the total mixing energy 10654 mg.

The effect of changing the composition of the silane reagent used to modify the filler material is shown in Table I.

TABLE I

Effect of varying the silane reagent on formulations containing Silicon powder, Celcon M450 binder, PEG 8000, and Wax C

| Silane reagent | Vol % of Silicon filler in the composition | Initial Torque (mg) | Final Torque (mg) | Total mixing Energy (mg) |
|---|---|---|---|---|
| Octadecyl triethoxy-silane | 65.0 | 104 | 70 | 1681 |
| Octadecyl triethoxy-silane | 67.0 | 160 | 143 | 2645 |
| Octyl triethoxy-silane | 67.0 | 563 | 294 | 6321 |
| Methacryl-oxypropyl trimeth-oxysilane | 65.0 | 1765 | 99 | 5959 |
| Trimeth-oxysilyl-propyldie-thylene-triamine | 67.0 | 1896 | 178 | 10587 |

EXAMPLE 6

Injection molding of the formulation and conversion to a finished part:

A 3 kg batch of moldable formulation was prepared and pelletized as in Example 1, and dried overnight in air at 50° C. It was then injection molded on an Arburg "All Rounder" (Model 221- 55-250 machine (250 KN tons Maximum clamp force, 25 mm screw diameter, screw L/D =18, 2.58 cu. in. maximum shot size) fitted with a "pre-combustion chamber" mold and set for the following conditions:

Injection and Hold Pressures : 750 and 650 psi

Mold Temperature : 130° C.

Barrel Temperature : 190° C.

Hold Time : 20 sec.

Sixty molded parts, each weighing 33 grams were produced.

The organic binder components were removed from the molded shapes by a programmed-temperature oxidation according to the Schedule in Table 2.

TABLE 2

Schedule for rapid removal of binder components from a pre-combustion chamber shape

| Temperature °C. | Heating Rate °C./hour | Elapsed Time (hour) |
|---|---|---|
| Ambient to 125 | 18.0 | 5.6 |
| 125–150 | 9.0 | 2.8 |
| 150–240 | 4.5 | 20.0 |
| 240–280 | 9.0 | 4.4 |
| 280–400 | 20.0 | 6.0 |

This schedule produced porous, blister-free, crack-free bodies that still retained the original molded pre-combustion chamber shape.

The burnt out bodies were then nitrided in a nitrogen atmosphere at 735 torr. at temperatures that were programmed from 1000° C. to 1450° C. at a heating rate of 6° C. per hour. The parts that resulted had densities higher that 2.5 gram/cc and strengths of more than 200 MPa.

What is claimed is:

1. An injection moldable composition suitable for forming ceramic or metallic greenbodies comprising in combination:
   (a) an inorganic or metallic filler having a particle size from about 0.01 micron to about 1000 microns present in an amount of at least from about 63 volume percent to about 92 volume percent;
   (b) a binding organic matrix resin; and
   (c) an organosilane processing reagent represented by the general formula:

$SiX_1X_2X_3X_4$ wherein at least one of $X_1$, $X_2$, $X_3$ or $X_4$ is an unfunctionalized alkyl or alkenyl group having 10 to 35 carbon atoms and at least one of $X_1$, $X_2$, $X_3$ or $X_4$ is an alkoxy group or halide, such that moldable composition exhibits a low initial mixing torque upon mechanical agitation.

2. The composition of claim 1, wherein the filler material is selected from the group consisting of silicon, silicon nitride, silicon carbide, alumina, aluminum nitride, titania, zirconia, metal powders and mixtures thereof.

3. The composition of claim 1, wherein the filler material is silicon.

4. The composition of claim 1, wherein the filler material is stainless steel.

5. The composition of claim 1, wherein the filler is present in an amount of from about 64 to 84 volume percent.

6. The composition of claim 1, wherein the matrix resin is a polyacetal resin.

7. The composition of claim 1, wherein the matrix resin is a polypropylene resin.

8. The composition of claim 6, wherein the polyacetal resin is a copolymer of trioxane with ethylene oxide.

9. The composition of claim 6, wherein the polyacetal resin is a homopolymer of formaldehyde.

10. The composition of claim 1, wherein the matrix resin is present in an amount of from about 8 volume percent to about 37 volume percent.

11. The composition of claim 1, wherein the silane reagent is octadecyl triethoxysilane.

12. The composition of claim 1, wherein the amount of the silane present is sufficient to coat at least one monolayer of the reagent on the filler particles.

13. The composition of claim 1, which further contains a plasticizer from about 1 to about 3 weight percent, based on the weight of the binding agent.

14. The composition of claim 1, which further contains a wetting agent from about 0.2 weight percent to about 5 weight percent, based on the weight of the binding agent.

15. The composition of claim 13, wherein the plasticizer is a polyethylene glycol.

16. The composition of claim 14, wherein the wetting agent is a wax.

17. A process of preparing an injection moldable composition suitable for forming ceramic or metallic greenbodies by preparing an intimate admixture of:

(a) an inorganic or metallic filler having a particle size from about 0.01 micron to about 1000 microns present in an amount of at least from about 63 volume percent to 92 volume percent;

(b) a binding organic matrix resin; and (c) an organosilane processing reagent of the general formula:

$$SiX_1X_2X_3X_4$$

wherein at least one of $X_1$, $X_2$, $X_3$ or $X_4$ is an unfunctionalized alkyl or alkenyl group having 10 to 35 carbon atoms and at least one of $X_1$, $X_2$, $X_3$ or $X_4$ is an alkoxy group or halide, such that the moldable composition exhibits a low initial mixing torque upon mechanical agitation.

18. The process of claim 17, wherein the filler material is selected from the group consisting of silicon, silicon nitride, silicon carbide, alumina, aluminum nitride, titania, zirconia, metal powders and mixtures thereof.

19. The process of claim 17, wherein the filler material is silicon.

20. The process of claim 17, wherein the organic matrix resin is a polyacetal resin.

* * * * *